United States Patent
Kawaguchi et al.

(10) Patent No.: US 7,727,679 B2
(45) Date of Patent: *Jun. 1, 2010

(54) OPTICAL REFRACTIVE INDEX-MODIFYING POLYMER COMPOSITION, HOLOGRAM RECORDING MATERIAL AND METHOD OF CONTROLLING REFRACTIVE INDEX

(75) Inventors: Yoshihide Kawaguchi, Ibaraki (JP); Yutaka Moroishi, Ibaraki (JP); Tetsuo Inoue, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 914 days.

This patent is subject to a terminal disclaimer.

(21) Appl. No.: 10/587,842

(22) PCT Filed: Jan. 6, 2006

(86) PCT No.: PCT/JP2006/300085

§ 371 (c)(1),
(2), (4) Date: Jul. 28, 2006

(87) PCT Pub. No.: WO2006/073178

PCT Pub. Date: Jul. 13, 2006

(65) Prior Publication Data

US 2007/0128523 A1 Jun. 7, 2007

(30) Foreign Application Priority Data

Jan. 7, 2005 (JP) .............................. 2005-002592

(51) Int. Cl.
*G03H 1/02* (2006.01)
(52) U.S. Cl. .................... 430/1; 430/2; 430/281.1; 359/3
(58) Field of Classification Search .................. None
See application file for complete search history.

(56) References Cited

U.S. PATENT DOCUMENTS 3,993,485 A 11/1976 Chandross et al.

(Continued)

FOREIGN PATENT DOCUMENTS

CN 1413223 A 4/2003

(Continued)

OTHER PUBLICATIONS

International Search Report for PCT/JP06/300085 dated Mar. 20, 2006.

(Continued)

*Primary Examiner*—Martin J Angebranndt
(74) *Attorney, Agent, or Firm*—Sughrue Mion, PLLC

(57) ABSTRACT

The present invention provides an optical refractive index-modifying polymer composition which can efficiently modulate (change) refractive index upon light irradiation, and exhibits such high storage stability that the once modulated refractive index does not substantially change anymore upon time elapse, and the optical refractive index-modifying polymer composition comprises as a main component a polymer (A) which is a polymer of monomers including an acrylic vinyl monomer represented by the following formula (1):

$$CH_2=C(R^1)-C(=O)O-R^2=CH_2 \quad (1)$$

wherein $R^1$ represents a hydrogen atom or a methyl group, $R^2$ represents a saturated or unsaturated hydrocarbon group having 1 to 20 carbon atoms, and the molecule may contain a hetero atom or a halogen atom, as an essential component and contains a remaining radical-polymerizable side-chain vinyl group in the molecule, wherein the composition comprises a thermally curable polymer (B) in an amount of 5 to 60 parts by weight per 100 parts by weight of the polymer (A).

10 Claims, 2 Drawing Sheets

U.S. PATENT DOCUMENTS

| | | | | |
|---|---|---|---|---|
| 4,913,990 | A | * | 4/1990 | Rallison .................. 430/30 |
| 5,098,803 | A | | 3/1992 | Monroe et al. |
| 5,492,942 | A | * | 2/1996 | Kobayashi et al. ............ 522/14 |
| 5,698,345 | A | * | 12/1997 | Ohe et al. .................... 430/2 |
| 2007/0066705 | A1 | * | 3/2007 | Kawaguchi et al. ......... 522/178 |
| 2008/0305404 | A1 | * | 12/2008 | Kawaguchi .................. 430/2 |

FOREIGN PATENT DOCUMENTS

| | | | | |
|---|---|---|---|---|
| JP | 60-88005 | A | | 5/1985 |
| JP | 5-94014 | A | | 4/1993 |
| JP | 5-107999 | A | | 4/1993 |
| JP | 5-197324 | A | | 8/1993 |
| JP | 06-175565 | | * | 6/1994 |
| JP | 7-70399 | A | | 3/1995 |
| JP | 9-106240 | A | | 4/1997 |
| JP | 9-230594 | A | | 9/1997 |
| JP | 2003-147017 | A | | 5/2003 |
| JP | 2005-126688 | | * | 5/2005 |
| JP | 2005-126688 | A | | 5/2005 |
| JP | 2005-275158 | A | | 10/2005 |
| WO | 01/30874 | A1 | | 5/2001 |
| WO | WO 2005/033153 | A1 | | 4/2005 |

OTHER PUBLICATIONS

Chinese First Office Action dated Jun. 26, 2009, English language translation.

* cited by examiner

OPTICAL REFRACTIVE INDEX-MODIFYING POLYMER COMPOSITION, HOLOGRAM RECORDING MATERIAL AND METHOD OF CONTROLLING REFRACTIVE INDEX

TECHNICAL FIELD

The present invention relates to an optical refractive index-modifying polymer composition which can easily modulate refractive index upon light irradiation and can stably maintain the modulated refractive index upon time elapse, hence can stably maintain, for example, a difference in refractive index between a light-irradiated part and a light-unirradiated part. Moreover, it relates to a hologram recording material using the same and further a method of controlling refractive index.

BACKGROUND ART

Hologram is one wherein an interference pattern of a coherent light of laser is recorded on a photosensitive material or the like. Since hologram has multiple functions, it is diversely utilized for optical elements, three-dimensional image displays, interference measurement, image/information processing, and the like. Moreover, since hologram can be regarded as an equivalent to information recording at a sub-micron unit, it is widely utilized as marks for preventing counterfeit of securities, credit cards, and the like.

In particular, in a volume phase-type hologram, a phase can be modulated by not optical absorption but formation of spatial interference fringes having different diffractive indices in a hologram recording medium without absorbing a light beam passing through the image, so that it is expected to apply it to hologram optical elements and hologram recording materials in addition to display uses in recent years.

As such hologram recording materials, there have been proposed an photo-curable resin composition wherein constituting components of a photopolymerization initiator, a 3-ketocoumarin and a diaryliodonium salt are used in combination (see, Patent Document 1) and a hologram recording material wherein a photopolymerization initiator and polymethyl methacrylate as a supporting polymer are combined (see, Patent Document 2).

Moreover, as a photopolymerizable sensitive material capable of preparing hologram by one treating step without involving any wet treatment, there have been proposed two types of photosensitive materials, i.e., the following first and second examples (see, Patent Document 3).

The first example is a photosensitive resin composition comprising a combination of two unsaturated ethylenic monomers different in reactivity and refractive index and a photopolymerization initiator, e.g., cyclohexyl methacrylate, N-vinylcarbazole, and benzoin methyl ether and capable of hologram recording by holding them between two glass plates and exposing it by means of a two-beam optical system.

The second example is a photosensitive resin composition comprising four components, i.e., a polymerizable unsaturated ethylenic monomer and an unsaturated ethylenic monomer acting as a crosslinking agent at the polymerization thereof which have similar refractive indices, a non-reactive compound having an refractive index different from those of the above two monomers, and a photopolymerization initiator, e.g., butyl methacrylate, ethylene glycol dimethacrylate, 1-phenylnaphthalene, and benzoin methyl ether and capable of manufacturing hologram as in the case of the first example.

Furthermore, there is a proposal wherein a basic composition is composed of a thermoplastic resin, a polymerizable unsaturated ethylenic monomer, and a photopolymerization initiator and, in order to enhance modulation of refractive index, a difference in refractive index is achieved by the use of a compound having an aromatic ring as either of the thermoplastic resin or the polymerizable unsaturated ethylenic monomer (see, Patent Document 4).

In addition, it is proposed to blend a cation-polymerizable monomer and a cationic polymerization initiator instead of the plasticizer in the above proposal (see, Patent Document 5). Also, there has been proposed a photosensitive resin composition for hologram recording comprising an epoxy resin, a radical-polymerizable unsaturated ethylenic monomer, and a photo radical polymerization initiator (see, Patent Document 6).

Patent Document 1: JP-A-60-88005
Patent Document 2: JP-A-4-31590
Patent Document 3: U.S. Pat. No. 3,993,485
Patent Document 4: U.S. Pat. No. 5,098,803
Patent Document 5: JP-A-5-107999
Patent Document 6: JP-A-5-94014

DISCLOSURE OF THE INVENTION

Problems that the Invention is to Solve

Thus, various materials for achieving hologram by modulating refractive index upon light irradiation have hitherto been proposed. In this kind of materials, it is necessary to effectively modulate refractive index upon light irradiation and high storage stability is required without changing the once modulated refractive index upon time elapse. However, all the above known materials are not necessarily thoroughly satisfy these characteristics.

In consideration of such circumstances, an object of the invention is to provide an optical refractive index-modifying material which can efficiently modulate (change) refractive index upon light irradiation, and exhibits such high storage stability that the once modulated refractive index does not substantially change anymore upon time passage. Moreover, another object thereof is to provide a hologram recording material using the same and a method of controlling refractive index.

Means for Solving the Problems

As a result of the extensive studies for solving the above problems, the present inventors have found that, by forming a polymer containing a remaining radical-polymerizable side-chain vinyl group in the molecule through a specific polymerization process and increasing change in density through crosslinking the above side-chain vinyl group upon light irradiation of a material comprising the polymer as a main component, refractive index of the above material can be effectively modulated (increased). Also, they have found that, when a thermally curable polymer is incorporated into the main component in a specific amount and the mixture was heated to a temperature equal to or higher than the curing temperature of the above thermally curable polymer after modulation of refractive index upon light irradiation, such high storage stability that the once modulated refractive index does not substantially change anymore upon time elapse can be attained through suppression of the reaction of the remaining above side-chain vinyl group by fixing the polymer molecule upon thermal curing.

As a result of further studies based on the above findings, the invention has been accomplished. Namely, the invention relates to an optical refractive index-modifying polymer composition comprising as a main component a polymer (A)

which is a polymer of monomers including as an essential component an acrylic vinyl monomer represented by the following formula (1):

$$CH_2=C(R^1)-C(=O)O-R^2=CH_2 \quad (1)$$

wherein $R^1$ represents a hydrogen atom or a methyl group, $R^2$ represents a saturated or unsaturated hydrocarbon group having 1 to 20 carbon atoms, and the molecule may contain a hetero atom or a halogen atom, wherein the polymer (A) contains a remaining radical-polymerizable side-chain vinyl group in the molecule, and the composition comprises a thermally curable polymer (B) in an amount of 5 to 60 parts by weight per 100 parts by weight of the polymer (A).

The optical refractive index-modifying polymer composition is preferably a composition wherein an increase in refractive index (Δn) before and after irradiation is 0.005 or more when the composition is irradiated with a light in an ultraviolet region in an integrated light quantity of 10 J/cm² or less. Moreover, it is preferably a composition wherein a difference (Y-X) between refractive index (X) after modulating refractive index upon irradiation and further thermally curing the thermally curable polymer (B) upon heating at a temperature equal to or higher than the curing temperature of the thermally curable polymer (B) and refractive index (Y) when the composition is subsequently irradiated with a light in an ultraviolet region in an integrated light quantity of 1 J/cm² or less, is 0.003 or less.

As preferred embodiments, the invention can provide the above optical refractive index-modifying polymer composition wherein tacticity of the polymer (A) is 70% or more as syndiotacticity (rr), the above optical refractive index-modifying polymer composition wherein the thermally curable polymer (B) is a thermally curable polymer having at least two epoxy groups in the molecule, the above optical refractive index-modifying polymer composition wherein the thermally curable polymer (B) is contained in an amount of 5 to 35 parts by weight per 100 parts by weight of the polymer (A), the above optical refractive index-modifying polymer composition wherein the curing temperature of the thermally curable polymer (B) is 150° C. or lower, and the above optical refractive index-modifying polymer composition which contains at least one selected from a photoinitiator, a sensitizer, a chain transfer agent, and a thermally acid-generating agent.

Moreover, the invention can provide a hologram recording material comprising the optical refractive index-modifying polymer composition having each of the above constitutions and a method of controlling refractive index comprising modulating refractive index upon irradiating the optical refractive index-modifying polymer composition having each of the above constitutions with a light and subsequently thermally curing the thermally curable polymer (B) upon heating at a temperature equal to or higher than the curing temperature of the thermally curable polymer (B).

Advantages of the Invention

This, the invention can provide an optical refractive index-modifying polymer composition which can freely increase and modulate refractive index upon light irradiation in an optional light quantity by using as a main component a polymer containing a remaining radical-polymerizable side-chain vinyl group and incorporating a thermally curable resin thereto and also such high storage stability that the once modulated refractive index does not substantially change anymore upon time elapse can be exhibited through suppression of the reaction of the remaining side-chain vinyl group upon thermal curing as well as a method of controlling refractive index as mentioned above.

Moreover, by the use of the optical refractive index-modifying polymer composition, there can be provided a hologram recording material and a hologram recording medium capable of forming volume phase-type hologram excellent in weather resistance, heat resistance, chemical stability, and storage stability and also excellent in high resolution, high diffraction efficiency, high transparency, and reproducibility of regenerated wavelength by dry treatment, and a hologram material using the same.

BEST MODE FOR CARRYING OUT THE INVENTION

Figure 1:
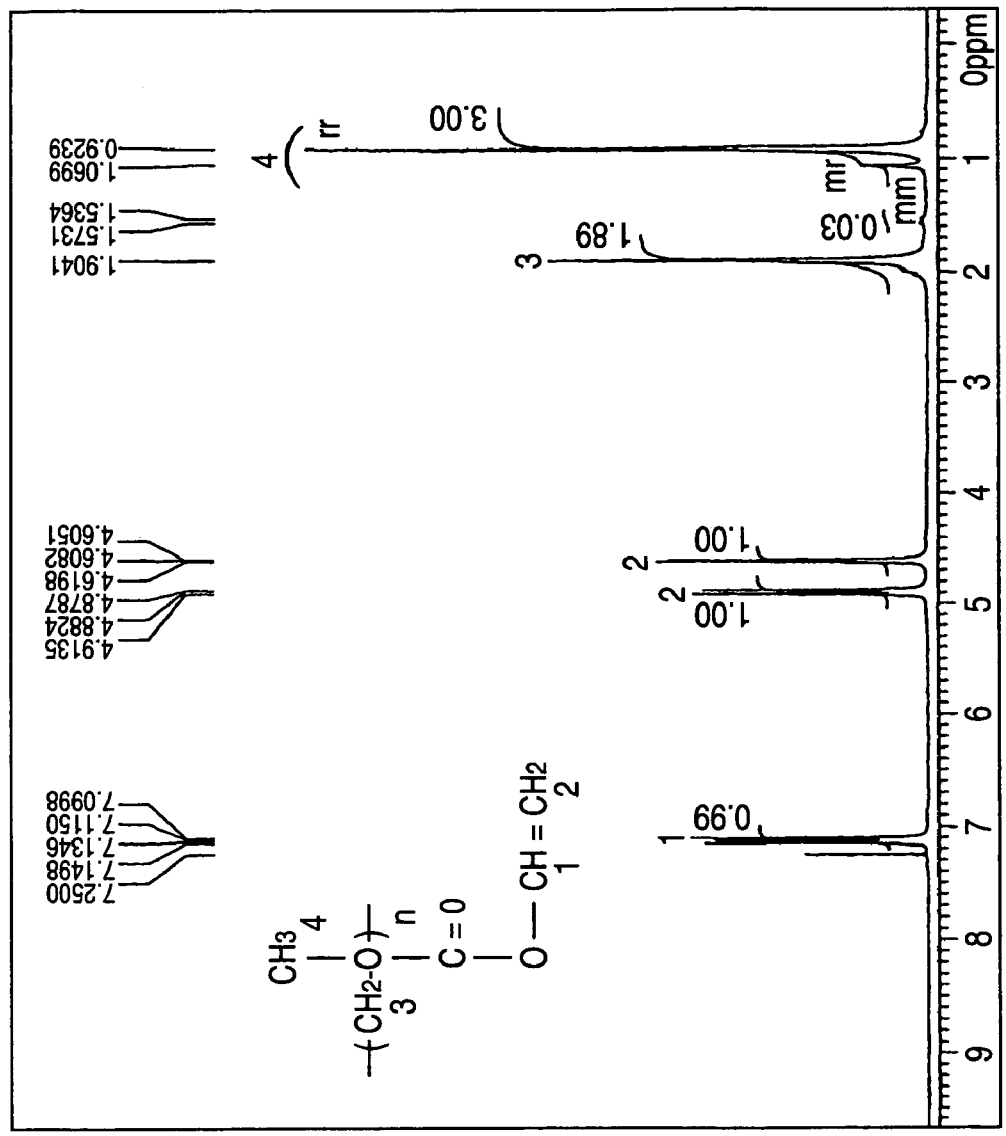
FIG. 1 a characteristic illustration showing a 1H-NMR of polyvinyl methacrylate (PVMA) obtained in Example 1.

The polymer (A) for use in the invention is a polymer derived from monomers composed of an acrylic vinyl monomer represented by the following formula (1):

$$CH_2=C(R^1)-C(=O)O-R^2=CH_2 \quad (1)$$

wherein $R^1$ represents a hydrogen atom or a methyl group, $R^2$ represents a saturated or unsaturated hydrocarbon group having 1 to 20 carbon atoms, and the molecule may contain a hetero atom or a halogen atom, as an essential component and contains a remaining radical-polymerizable side-chain vinyl group in the molecule.

The acrylic vinyl monomer represented by the above formula (1) is not particularly limited and examples thereof include vinyl methacrylate, vinylethyl methacrylate, vinyloctyl methacrylate, vinylhexyl methacrylate, vinylbutyl methacrylate, vinyl acrylate, vinylethyl acrylate, and the like.

Of these, in view of versatility, availability, and heat resistant properties of the materials, vinyl methacrylate is preferred. Of optical polymers, polyvinyl methacrylate (hereinafter referred to PVMA), which is a homopolymer of vinyl methacrylate, is most preferred since it has an excellent transparency and also birefringence hardly occurs, processability is good, mechanical strength is well balanced, and a difference in refractive index obtained upon light irradiation is large.

With regard to the polymer (A) of the invention, in addition to the homopolymer of the acrylic vinyl monomer such as PVMA, by forming a copolymer of the acrylic vinyl monomer represented by the formula (1) with another monomer, heat resistant properties and compatibility with thermally curable resins can be improved.

Such a copolymer may be either of a block copolymer wherein a copolymer sequence of the acrylic vinyl monomer A represented by the formula (1) with the other monomer B forms a block chain such as AAAAAA-BBBBBB . . . or a random copolymer wherein the above sequence forms a random chain such as ABAABABABBA . . . .

In the above copolymers, in order to obtain a large difference in refractive index at a low irradiation intensity of a light such as ultraviolet ray, a random copolymer is preferred. Even a block copolymer can be suitably utilized in consideration of an increase in refractive index and desired properties.

As mentioned above, when a copolymer of the acrylic vinyl monomer represented by the formula (1) with the other monomer is used, the kind of the polymer material can be optimized in view of film physical properties, transparency, production cost, and the like. Particularly in the random copolymer, an initial reactivity of the side-chain vinyl group is enhanced and an efficient increase in refractive index can be achieved at a low irradiation intensity of a light such as ultraviolet ray.

The other monomer to be used for such a purpose may be any monomer which is polymerizable with the acrylic vinyl monomer and inactive to the polymerization catalyst or does not deactivate the catalytic activity. In view of copolymerizability, (meth)acrylate esters are preferred.

Specifically, methyl methacrylate and ethyl methacrylate may be mentioned. In addition, monomers containing a halogen atom, such as trifluoroethyl methacrylate and monomers containing a hetero atom, such as diethylaminoethyl methacrylate can be also employed.

Even a monomer having a functional group deactivating the catalytic activity can be copolymerized after capping the functional group. For example, a hydroxyethyl methacrylate is copolymerizable when capped with a trimethylsilyl group. Similarly, a (meth)acrylate having a carboxyl group is also usable.

In such copolymers, the ratio of the acrylic vinyl monomer represented by the formula (1) to the above other monomer is not particularly limited as far as it is a range where a desired change in refractive index is obtained before and after light irradiation. Usually, it is suitable that the other monomer is from 10 to 80% by mol, particularly from 10 to 50% by mol based on the whole monomers. When the other monomer is less than 10% by mol, it is difficult to realize a merit of copolymerization. When it exceeds 80% by mol, the radical reactivity of the side-chain vinyl group derived from the acrylic vinyl monomer represented by the formula (1) is apt to decrease.

In the invention, the polymer (A) can be obtained by polymerizing the acrylic vinyl monomer represented by the formula (1) alone or a mixture thereof with the other monomer using a specific anionic initiator as a polymerization catalyst.

In the radical polymerization, the side-chain vinyl group is also consumed during the polymerization, the vinyl group to be used for increasing refractive index cannot be left, and also a network polymer (gel) insoluble in a solvent is formed. Moreover, even among an anionic initiator, a conventional anionic initiator such as BuLi or a Grignard reagent which is an organometallic compound is not preferred since part of the side-chain vinyl groups may be involved in a crosslinking reaction during polymerization and the yield and molecular weight of the resulting polymer may decrease.

Therefore, in the invention, as an anionic initiator for obtaining the above polymer, a metal complex catalyst containing a rare-earth metal as an active center is used.

The rare-earth metal herein means a metal of the 13th Group metals such as Sc, Y, lanthanide and actinide and the active center means a moiety which coordinates or bonds to a monomer to directly initiate a polymerization reaction. Such a metal complex catalyst is so-called a metallocene catalyst, which includes a complex of cyclopentadienyl with a metal ion, a complex of indenyl with a metal ion, a complex of fluorenyl with a metal ion, and the like.

Among such metal complex catalysts, a complex of cyclopentadienyl with a metal ion, particularly a metal complex compound represented by the following formula (2) is preferably used:

wherein Cp1 and Cp2 each independently is a unsubstituted cyclopentadienyl or substituted cyclopentadienyl and Cp1 and Cp2 may be bonded to each other directly or via a connecting group. Mr is an r-valent rare-earth metal atom and r is an integer of 2 to 4. R is a hydrogen atom or a linear alkyl group having 1 to 3 carbon atoms. L is a solvent having coordinating ability. p is the number of R and q is the number of L, each of which is an integer of 0 to 2 and is selected so that they satisfy the expression: r=p+2 relative to the above r.

In the above formula (2), in the case that Cp1 or Cp2 is a substituted cyclopentadienyl, a methyl group or a trimethylsilyl group is preferred as a substituent. The number of the substituents in Cp1 or Cp2 is preferably from 3 to 5.

Cp1 or Cp2 includes $C_5H_5$, $C_5(CH_3)_5$, $C_5H_2(CH_3)_3$, $C_5(CH_2CH_3)_5$, $C_5H_2(CH_2CH_3)_3$, $C_5H_2[CH(CH_3)_2]_3$, $C_5H_2[Si(CH_3)_3]_3$, $C_5H_2[CH(CH_3)_2]_3$, and the like.

Cp1 and Cp2 may be bonded to each other via a single bond or a connecting group, and particularly are preferably bonded to each other via a connecting group.

As the connecting group, —$(CH_2)_n[Si(CH_3)_2]_m$— [wherein n and m each is an integer of 0 to 3 and (m+n) is 1 to 3] is preferred and particularly, a dimethylsilyl group (n=0 and m=1) or dimethylene (n=2 and m=0) is preferred. Moreover, the connecting group may be a connecting group containing a hetero atom such as an ethereal oxygen atom.

Furthermore, in the above formula (2), M is an r-valent rare-earth metal atom which forms an active center and yttrium (Y), ytterbium (Yb), samarium (Sm), and lutetium (Lu) are preferred. The valency (r) is 2, 3, or 4, and particularly 2 or 3 is preferred.

R is a hydrogen atom or a linear alkyl group having 1 to 3 carbon atoms and a methyl group is preferred.

L is a solvent having coordinating ability, which is preferably a solvent containing a hetero atom and an ethereal solvent is preferred. As the ethereal solvent, a cyclic ethereal solvent such as tetrahydrofuran or tetrahydropyran, diethyl ether, t-butyl methyl ether, or the like is preferred.

Among the metal complex compounds represented by the above formula (2), the metal complex compounds represented by the following formulae (3) to (5) are particularly preferably used:

wherein CP* is 1,2,3,4,5-pentamethylcyclopentadienyl and THF is tetrahydrofuran.

The polymerization reaction is desirably carried out under anhydrous and oxygen-free conditions. Moreover, the polymerization reaction is preferably carried out under an atmosphere of an inert gas such as nitrogen or argon. Furthermore, the polymerization reaction is preferably carried out in the presence of a solvent. As the solvent, a non-polar solvent is preferred and particularly, an aromatic non-polar solvent such as benzene, toluene, or xylene is preferred.

The amount of the monomer at the polymerization is preferably from 5 to 30% by weight in the solvent. When the amount is less than 5% by weight, there is a possibility that the molecular weight does not sufficiently increase. When the amount exceeds 30% by weight, there is a risk that viscosity of the system increases and thus conversion of the polymerization lowers. Moreover, the amount of the metal complex catalyst is preferably from 0.01 to 10% by mol, particularly preferably from 0.1 to 5% by mol relative to the monomer.

The reaction temperature at the polymerization is preferably 100° C. or lower, particularly preferably from about −95° C. to +30° C. More preferred is from −95° C. to −25° C. When the polymerization is carried out at a lower temperature, there is a tendency that tacticity of the resulting polymer is improved and thus syndiotacticity is enhanced.

The polymer (A) thus synthesized contains a remaining radical-polymerizable side-chain vinyl group derived from the acrylic vinyl monomer represented by the formula (1) in the polymer molecule and the remaining rate is preferably 90% or more, more preferably 95% or more.

The unreacted radical-polymerizable side-chain vinyl group can be determined, for example, based on 1H-NMR. For example, in the case of PVMA, it can be calculated based on the area ratio of the peak (around 4.9 ppm) attributable to the proton derived from the vinyl group to the peak (around 1.3 to 0.6 ppm) attributable to the proton derived from the methyl group at α-position.

In the case that a copolymer of the acrylic vinyl monomer represented by the formula (1) with the other monomer is synthesized as the above polymer (A) by the polymerization reaction using an anionic initiator, a random polymer or a block copolymer can be freely synthesized as mentioned above, by suitably selecting the order of the addition of the above both monomers.

Moreover, the polymer (A) thus synthesized preferably has tacticity of 70% or more as syndiotacticity through selection of monomer(s). Thereby, the glass transition temperature (Tg) of the polymer becomes very high and a good heat resistance is achieved. Namely, the polymer (A) obtained by polymerization in the presence of a metal metallocene complex catalyst containing a rare-earth metal as an active center may have syndiotacticity of 70% or more.

In general, syndiotacticity is explained as follows. When two different atoms or atomic groups (substituents) are bonded to the carbon atom(s) of a repeating unit forming the main chain of a linear polymer molecule, stereoisomerism occurs, the carbon atom being centered.

At this time, in any repeating unit, one wherein the adjacent unit along the main chain always has an opposite configuration is called syndiotactic, one wherein the adjacent unit along the main chain always has an identical configuration is called isotactic, and one wherein the adjacent unit along the main chain has any configuration is called atactic, respectively. Moreover, the ratio of the syndiotactic part is called syndiotacticity, the ratio of the isotactic part is called isotacticity, and the ratio of the atactic part is called atacticity, respectively.

Syndiotacticity is an index for representing tacticity of a polymer.

The value of syndiotacticity in the invention is a value of polymerization units of syndiotactic triad among the total amount of the polymerization units derived from the monomers constituting a polymer. The triad means a chain composed of three repeating units of the polymer. When one of the configurations of the α-carbon (asymmetric carbon) of the carbonyl group in the three repeating units is expressed as d and the other is expressed as l, a chain connected as ddd or lll is called an isotactic triad, a chain connected as dld or ldl is called as a syndiotactic triad, a chain connected as ddl, lld, dll, or ldd is called as a heterotactic triad.

The syndiotacticity is determined by a nuclear magnetic resonance spectrometry. Namely, it is calculated by dissolving or swelling the polymer of the invention, measuring it by 1H-NMR or 13C-NMR spectrometry to determine integrated values of signals reflecting syndiotacticity, isotacticity, and atacticity, and determining ratios thereof.

In the case that the polymer of the invention is hardly soluble in a deuterated solvent, a deuterated solvent or an undeuterated solvent may be additionally used, if necessary. In the case that an undeuterated solvent is used, it is preferred to select a solvent containing an atom which does not influence the measurement on NMR. For example, there may be mentioned deuterated chloroform and deuterated benzene which do not influence 1H-NMR spectral data.

In this regard, the selection of the measuring nucleus on NMR can be suitably changed according to the spectral pattern of the polymer. Fundamentally, it is preferred to use 1H-NMR spectrometry. In the case that a necessary peak on 1H-NMR data overlaps the other unnecessary peak or is not measured on 1H-NMR, it is preferred to use 13C-NMR spectrometry.

Specifically, in the case that the substituent X which bonds to the α-carbon of the carbonyl group of the vinyl (meth)acrylate monomer is a hydrogen atom or a methyl group, utilizing the fact that the signal on 1H-NMR derived from the X has different chemical shifts depending on the hydrogen atom in the syndiotactic triad, the hydrogen atom in the isotactic triad, and the hydrogen atom in the atactic triad, the ratio of the syndiotactic triad (rr), the atactic (also called heterotactic) triad (mr), and the isotactic triad (mm) (rr/mr/mm) is determined by determining the area ratio of these signals.

In this regard, as a reference for attribution of NMR spectra, New edition Kobunshi Bunseki Handbook, ed. by Nihon Bunseki Kagaku Kai (1995) and Mackromol. Chem., Rapid. Commun., 14, 719 (1993) have been used.

Moreover, in the case that the substituent which bonds to the α-carbon of the carbonyl group of the vinyl (meth)acrylate monomer is a hydrogen atom or a trifluoromethyl group, syndiotacticity is determined by the area ratio of 13C NMR peaks.

Namely utilizing the fact that 13C-NMR signals of the α-carbon of the carbonyl group are different among the carbon atom in the syndiotactic triad, the carbon atom in the isotactic triad, and the carbon atom in the atactic triad, the ratio (rr/mr/mm) is determined by determining the area ratio of these signals.

The syndiotacticity in the invention is a value calculated as [rr/(rr+mr+mm)]×100(%) from each tacticity thus determined. The polymer (A) obtained by the polymerization reaction using the above anionic initiator becomes excellent in heat resistance and strength as compared with an atactic polymer since the value of the syndiotacticity (rr) is so high as 70% or more. The higher the syndiotacticity is, the more improved these physical properties are.

Thus, the polymer (A) of the invention has excellent physical properties in view of heat resistance and strength as compared with conventional polymers. The polymer (A) preferably has a number-average molecular weight of 2,000 or more. A higher molecular weight is preferred in view of strength and physical properties and particularly, 20,000 or more is suitable. Moreover, usually, it is suitably 500,000 or less.

The thermally curable polymer (B) for use in the invention is a polymer which is cured upon heating through a crosslinking reaction. Examples thereof include polymethyl methacrylate or copolymers thereof, acrylonitrile-styrene copolymers, polycarbonate, cellulose acetate, polyvinyl chloride, polyethylene terephthalate, epoxy resins, unsaturated polyester resins, polyurethane resins, styrene resins, allyl resins, urethane-acryl-styrene copolymers, diethylene glycol bisallyl carbonate, and the like.

These thermally curable polymer (B) preferably have a number-average molecular weight of 2,000 or more as in the case of the polymer (A). A higher molecular weight is preferred in view of strength and physical properties and particularly, 20,000 or more is suitable. Moreover, the number-average molecular weight is usually preferably 500,000 or less from the viewpoint of compatibility with the polymer (A) and solubility in a solvent.

Among such thermally curable polymers (B), epoxy resins are particularly preferably used since they exhibit good curability under an acid catalyst, the shrinking ratio after curing is also generally smaller than that of vinyl based polymers, and heat resistance after curing is excellent.

The epoxy resin is a thermally curable polymer having at least two epoxy groups in the molecule and the resin having a low thermally curable temperature and a short curing time is preferred. Moreover, from the viewpoints of light resistance, heat resistance, and transparency, an aliphatic or alicyclic epoxy resin is preferred. Furthermore, since the polymer (A) is a (meth)acrylic polymer, an epoxy resin having a (meth) acrylic skeleton is preferred in view of compatibility therewith. Of course, without limitation thereto, various epoxy resins can be arbitrarily used according to aimed uses.

In the invention, the thermally curable polymer (B) is used in a ratio of usually 5 to 60 parts by weight, preferably 10 to 50 parts by weight per 100 parts by weight of the above polymer (A). When the amount of the thermally curable polymer (B) is too large, there is a possibility that necessary refractive index modulation is not obtained and compatibility with the polymer (A) decreases, and transparency is deteriorated. Moreover, when the amount of the thermally curable polymer (B) is too small, a reaction-suppressing effect of the remaining vinyl group through thermal curing becomes insufficient.

In this regard, the amount of the thermally curable polymer (B) to be used is desirably suitably determined according to the kind of the thermally curable polymer (B) and the kind of the polymer (A). For example, when an epoxy resin is used as the thermally curable polymer (B), the amount thereof is desirably in an amount of 5 to 35 parts by weight per 100 parts by weight of the above polymer (A).

The optical refractive index-modifying polymer composition of the invention comprises the polymer (A) as a main component and the thermally curable polymer (B) is contained therein in the above specific amount. Owing to the remaining radical-polymerizable side-chain vinyl group in the molecule of the polymer (A), the composition has a property that refractive index is increased and modulated when the above vinyl group is crosslinked upon irradiation of a light such as ultraviolet ray. With regard to the property, an increase in refractive index (Δn) before and after irradiation is 0.005 or more, at most 0.01 or more, when the composition is irradiated with a light in an ultraviolet region in an integrated light quantity of 10 J/cm² or less.

In this regard, the above refractive index is measured with He—Ne laser (wavelength: 633 nm) using m-Line method (prism coupling method).

In this case, it is possible to measure it in a TE (transverse electric) mode (a polarized wave mode of a light in the direction parallel to the film surface of a material) and in a TM (transverse magnetic) mode (a polarized wave mode of a light in the direction perpendicular to the film surface of a material). In the invention, the increase of refractive index is particularly evaluated at the TE mode.

Moreover, in a light guide and an optical integrated circuit, when a difference in refractive index between the TE mode and the TM mode is large, transmission loss of a light becomes large and a phase may generate in optical information. Therefore, a material having a small difference in refractive index between the TE mode and the TM mode, i.e., a small polarization dependent loss (PDL) of the material is desired.

Specifically, the difference in refractive index between the TE mode and the TM mode is desirably usually around 0.001 or less. Since the optical refractive index-modifying polymer composition of the invention comprises an acrylic material as in the case of the polymer (A), birefringence is small as compared with the materials widely used as light guide materials, so that the above PDL is small and thus the composition is particularly advantageous.

Moreover, the optical refractive index-modifying polymer composition of the invention has a specific property that, by thermal curing of the thermally curable polymer (B) after refractive index is increased and modulated upon irradiation of the above light, the reaction of the side-chain vinyl group is suppressed through fixing of the polymer molecules and such high storage stability that the once modulated refractive index does not substantially change anymore upon time passage is exhibited.

As the property, for example, a difference (Y−X) between refractive index (X) after modulating refractive index upon irradiation and further thermally curing the thermally curable polymer (B) upon heating at a temperature equal to or higher than the curing temperature of the thermally curable polymer (B) and refractive index (Y) when the composition is subsequently irradiated with a light in an ultraviolet region in an integrated light quantity of 1 J/cm² or less, is 0.003 or less, particularly preferably 0.002 or less.

Into the optical refractive index-modifying polymer composition of the invention having such a property can be incorporated at least one additive selected from a photoinitiator, a sensitizer, and a chain transfer agent, if necessary. By incorporating these additives, crosslinking reactivity through light irradiation of the remaining side-chain vinyl group in the molecule of the polymer (A) can be improved and thereby increasing modulation of refractive index can be more efficiently induced.

In this regard, there is a case that the crosslinking reactivity through light irradiation of the above vinyl group is hardly exhibited with the polymer (A) alone depending on the monomer composition of the polymer (A). By incorporating the above additives into such polymer (A), the crosslinking reactivity through light irradiation can be exhibited and thereby it becomes possible to induce the increasing modulation of refractive index.

The photoinitiator absorbs a light in an ultraviolet region and generates a radical. Examples thereof include hydrogen-abstracting benzophenone-based, acetophenone-based, thioxanthone-based, and the like ones. Moreover, as intramolecular cleavage-type, benzoin-based, alkylphenone-based, and the like ones may be mentioned [reference: Hikari Koka Gijutsu Jitsuyo Guide (Technonet) 2002].

Examples of the photosensitizer (photoinitiating auxiliary) include amine-based compounds such as triethanolamine and triisopropanolamine and amino compounds such as ethyl 4-dimethylaminobenzoate but are not limited thereto [reference: Shigaisen Koka System (Sogo Gijutsu Center) 1990].

In addition, there is a description in U.S. Pat. No. 3,652,275 that a chain transfer agent is effective as a photocuring system in combination with the photoinitiator.

Examples of such a chain transfer agent include those selected from the group consisting of N-phenylglycine, 1,1-dimethyl-3,5-diketocyclohexene, 2-mercaptobenzothiazole, 2-mercaptobenzoxazole, 2-mercaptobenzimidazole, pentaerythritol tetrakis(mercaptoacetate), 4-acetamidothiophenol, mercaptosuccinic acid, dodecanethiol, β-mercaptoethanol, 2-mercaptoethanesulfonic acid, 1-phenyl-4H-tetrazole-5-thiol, 6-mercaptopurine monohydrate, bis-(5-mercapto-1, 3,4-thiadiazol)-2-yl, 2-mercapto-5-nitrobenzimidazole, 2-mercapto-4-sulfo-6-chlorobenzoxazole, and the like.

Of these, 2-mercaptobenzoxazole (hereinafter referred to as 2-MBO), 2-mercaptobenzimidazole (hereinafter referred to as 2-MBI), 2-mercaptobenzothiazole (hereinafter referred to as 2-MBT), and the like are particularly preferably used.

Moreover, a thermally acid-generating agent can be incorporated into the above optical refractive index-modifying polymer composition of the invention, if necessary. By incorporating the thermally acid-generating agent, it is possible to lower the curing temperature of the thermally curable polymer (B) or to shorten the curing time thereof.

As the thermally acid-generating agent, from the viewpoints of curing rate, corrosiveness, safety and health, and the like, a suitable one is selected. Examples thereof include diazonium salts, iodonium salts, sulfonium salts, and the like. As commercially available products, there may be mentioned "Adekaopton CP-66", "idem CP-77" manufactured by Asahi Denka Kogyo K. K., "San-aid S1 series" manufactured by Sanshin Chemical Industry Co., Ltd., and the like.

In the invention, by the use of the optical refractive index-modifying polymer composition thus constituted, various hologram recording materials can be provided.

Namely, by the use of the optical refractive index-modifying polymer composition having the above constitution, there can be provided a hologram recording material and a hologram recording medium capable of forming a volume phase-type hologram excellent in weather resistance, heat resistance, chemical stability, and storage stability and also excellent in high resolution, high diffraction efficiency, high transparency, and reproducibility of regenerated wavelength by dry treatment, and a hologram material using the same.

Moreover, in the invention, there can be provided a method of controlling refractive index using the optical refractive index-modifying polymer composition having the above constitution. The method of controlling refractive index essentially comprises modifying refractive index upon irradiating the above optical refractive index-modifying polymer composition with a light and subsequently thermally curing the thermally curable polymer (B) upon heating at a temperature equal to or higher than the curing temperature of the thermally curable polymer (B).

The following will describe the case of utilizing a light in an ultraviolet region as a light for modulating refractive index as mentioned above. However, based on the fundamental principle of refractive index modulation, needless to say, the increasing modulation of refractive index can be similarly expected even when a light out of an ultraviolet region (e.g., visible region) is used as far as the composition has absorption at the wavelength of the light and the crosslinking reaction of the side-chain vinyl group can be excited.

In the method of controlling refractive index of the invention, a suitable molding treatment is first carried out using the above optical refractive index-modifying polymer composition of the invention and then it is irradiated with ultraviolet ray.

The wavelength of ultraviolet ray may be a wavelength capable of crosslinking the remaining radical-polymerizable side-chain vinyl group in the molecule of the polymer (A) to change the structure of the polymer (A) and to thereby achieve a large change in density. The wavelength is not categorically determined since it depends on irradiation intensity and the like but may be preferably from 200 to 450 nm, particularly from 250 to 350 nm.

The light source of the ultraviolet ray is suitably selected in consideration of the wavelength used for irradiation. For example, a high-pressure mercury lamp, a low-pressure mercury lamp, a metal halide lamp, an ultraviolet laser, or the like may be employed. At the irradiation, a wavelength filter for irradiation with a specific wavelength may be used.

With regard to the irradiation intensity of the ultraviolet ray, when it is too small, a photochemical reaction of the polymer having a radical-polymerizable side-chain vinyl group in the molecule cannot be induced and hence modulation of refractive index cannot be attained. Contrarily, when it is too large, there is a case that a molded article becomes opaque or strength thereof decreases. Thus, the intensity may be suitably determined in consideration thereof. Although it depends on the wavelength to be used for irradiation, it is suitable that the intensity is usually from about 0.001 to 3 $W/cm^2$, preferably from 0.1 to 1 $W/cm^2$.

The irradiation time of the ultraviolet ray is suitably determined in consideration of the difference in refractive index to be obtained. Namely, since refractive index of the molded article continuously increases upon ultraviolet irradiation, refractive index can be arbitrarily controlled by setting the irradiation time.

Since specific irradiation time varies depending on the irradiation wavelength and intensity of the ultraviolet ray, the time may be suitably set. For example, in the case that a molded article of PVMA is irradiated with an ultraviolet ray containing a wavelength range of 280 to 300 nm in an intensity of 300 $mW/cm^2$ to increase refractive index by 0.005, the irradiation time is suitably from about 0.5 to 2 minutes.

The ultraviolet irradiation can be carried out with increasing the temperature of the molded article. Thereby, the crosslinking reactivity of the remaining radical-polymerizable side-chain vinyl group in the molecule of the polymer (A) is enhanced and thus refractive index can be more efficiently modulated.

Specific temperature can be suitably set in the range not exceeding the melting temperature of the molded article or the thermal curing temperature of the thermally curable polymer (B). For example, in the case that the polymer (A) is PVMA and the thermally curable polymer (B) is composed of an epoxy resin, the temperature is suitably about 50° C. or lower.

In this regard, the modulation treatment of refractive index upon ultraviolet irradiation is not necessarily carried out in the presence of an inert gas in consideration of versatility of the embodiment to be used. However, since surface oxidation at the interface between a film and air is suppressed in the present of an inert gas such as $N_2$ and Ar and it becomes easy to obtain a large change in refractive index at a lower intensity, the presence of an inert gas is particularly preferred.

In the invention, when irradiated under such conditions, the remaining radical-polymerizable side-chain vinyl group in the molecule of the polymer (A) is crosslinked and thereby density of the molded article is elevated and refractive index thereof increases. As the above crosslinking reaction, any reactions of elevating the density, e.g., crosslinking of part of the molded article can be effectively utilized.

Upon ultraviolet irradiation as above, increasing modulation of refractive index of at most 0.01 or more can be achieved. Actually, when a difference in refractive index of 0.005 or more is obtained, it is a sufficiently high value for optical devices such as optical elements and optical recording materials.

The method of controlling refractive index of the invention comprises modulating refractive index of a molded article upon ultraviolet irradiation and subsequently thermally curing the thermally curable polymer (B) upon heating at a temperature equal to or higher than the curing temperature of the thermally curable polymer (B). Thereby, excellent storage stability such as weather resistance and heat resistance can be achieved without substantial change in the once modulated refractive index upon time elapse through suppression of the reaction of the remaining above side-chain vinyl group by fixing the polymer molecule.

The heating temperature and heating time vary depending on the kind of the thermally curable polymer (B) but are usually desirably 150° C. or lower and 2 hours or less, respectively. When the temperature exceeds 150° C., there is a risk of a reaction of the polymer (A) induced by the heat and also a risk of coloration owing to high temperature. When the heating time exceeds 2 hours, working efficiency is impaired. By adding a thermally acid-generating agent, it is possible to lower the curing temperature and shorten the curing time.

The following will describe the invention in further detail with reference to Examples and Comparative Examples. However, the invention is not limited to the following Examples alone. In the following, part(s) and % mean part(s) by weight and % by weight, respectively, unless otherwise noted.

EXAMPLE 1

<Synthesis of Catalyst>

A coordinating anionic polymerization catalyst was synthesized as follows.

To a 1 L flask substituted with argon were added 3.9616 g of $SmI_2$ and 330 ml of tetrahydrofuran (THF), and then 45.858 g of pentamethylcyclopentadienyl potassium salt [$(C_5Me_5)K$] was added thereto, followed by a reaction at room temperature. Thereafter, THF was removed under reduced pressure and toluene was added to the resulting solid mass, followed by collection of supernatant. After died under reduced pressure, $(C_5Me_5)_2Sm(THF)_2$ was recrystallized from THF and hexane. Then, 2.5 g of $(C_5Me_5)_2Sm(THF)_2$ was dissolved in 60 ml of toluene and 2.2 ml of triethylaluminum was added thereto, followed by a reaction under stirring. After removal of precipitates, recrystallization was conducted to obtain $(C_5Me_5)_2Sm(THF)$ <Synthesis of PVMA>

To a Schlenk tube from which moisture and air had been thoroughly removed was added 80 ml of toluene thoroughly dried and degassed, and then 20 ml (18.7 g/166.4 mmol) of vinyl methacrylate which had been purified by distillation after drying over $CaH_2$ was added thereto. After the inner temperature was controlled to −78° C., 0.189 g (0.373 mmol) of $(C_5Me_5)_2Sm(THF)$ as a catalyst synthesized by the above method and diluted with 5 ml of dry toluene was charged and polymerization was started. The amount of the catalyst was determined so that a ratio of monomer/catalyst became 446 and theoretical molecular weight was set at about 50,000.

After the whole was reacted at a polymerization temperature of −78° C. for 3 hours, the polymerization reaction was terminated by adding methanol to the reaction system. Furthermore, methanol was added thereto to precipitate the resulting polymer (PVMA), followed by isolation thereof. After dissolved in ethyl acetate, the product was again reprecipitated with methanol to perform purification.

The polymer was dried by drying under reduced pressure. Yielded amount of the formed polymer was found to be 18.7 g (yield >99%). Moreover, number-average molecular weight (Mn) was 77,000, weight-average molecular weight (Mw) was 115,000, and thus molecular weight distribution (Mw/Mn) was 1.49.

Furthermore, the remaining rate of the radical-polymerizable side-chain vinyl group in the polymer determined on 1H-NMR [remaining rate of vinyl group (%)=vinyl group (4.9 ppm)/methyl group (1.3 to 0.6 ppm)×100] was found to be 100% and tacticity of the main chain was 92% as syndiotacticity (rr).

Figure 2:
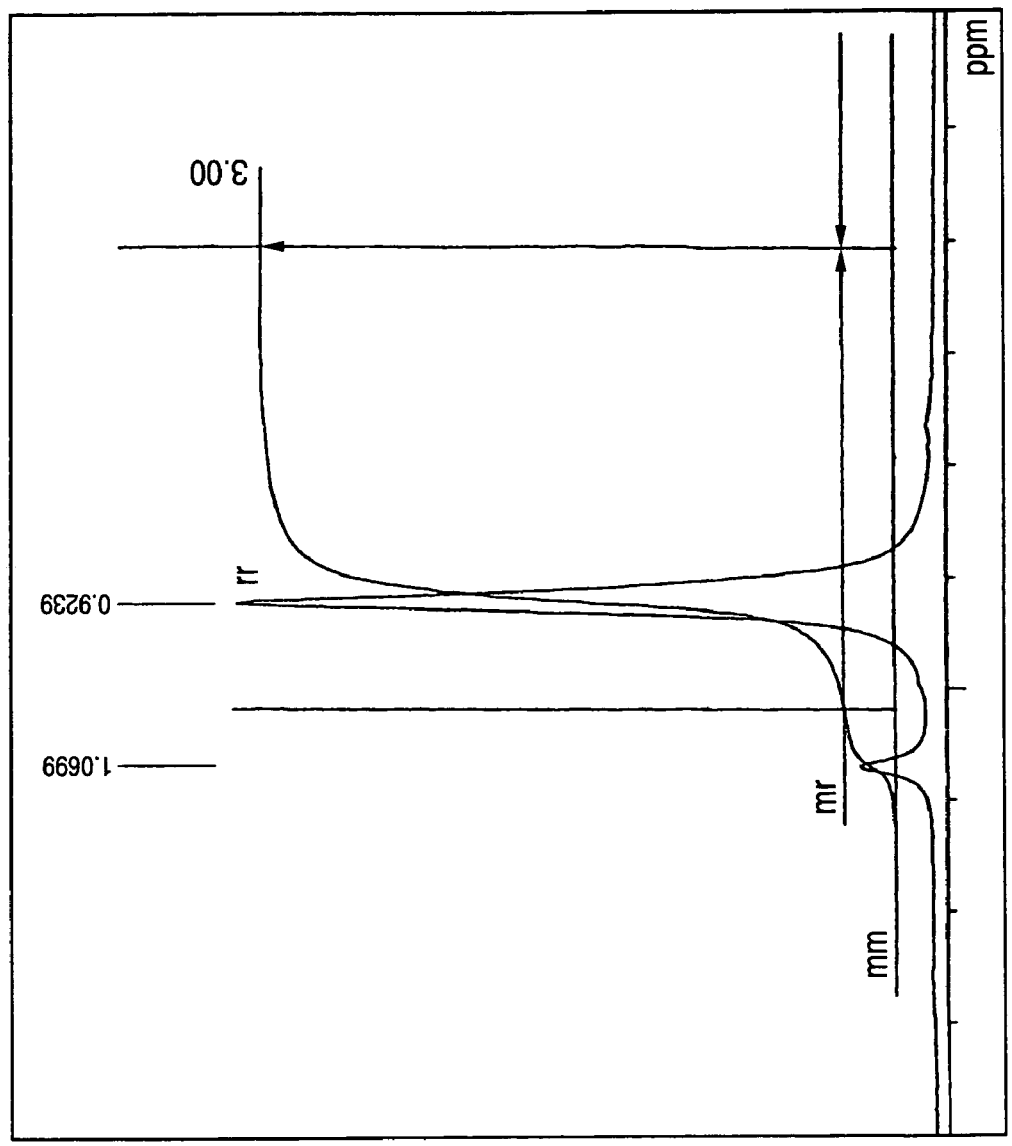
FIG. 2 an enlarged view of main chain methyl groups used for calculating tacticity on the 1H-NMR in FIG. 1.

A 1H-NMR chart of the above polymer (PVMA) was shown in FIG. 1. Moreover, an enlarged view on the main chain methyl groups used for calculation of tacticity on the 1H-NMR chart was shown in FIG. 2. For the above calculation of tacticity, integration curves of the main chain methyl groups [around 1.19 ppm(mm), 1.07 ppm(mr), 0.92 ppm(rr)] of PVMA detected in the range of 1.2 to 0.9 ppm were employed.

Then, about 0.1 g of thus obtained PVMA was immersed in 50 ml of ethyl acetate, followed by shaking for 2 days. When insoluble matter in ethyl acetate was extracted and thoroughly dried and the weight was divided by total weight of the polymer before dissolution in ethyl acetate to determine the proportion of the insoluble matter (gel fraction), it was found to be 0%.

<Preparation of Sample for Optical Refractive Index Modulation>

To 1.5 g of ethyl acetate were added 0.4 g of the above PVMA, 2-methyl-1-[4-(methylthio)phenyl]-2-morpholinopropane-1 as a photoinitiator ("Irgacure 907" manufactured by Ciba-Geigy) in an amount of 1% (0.004 g) relative to PVMA, 0.1 g of a thermally curable epoxy resin ["EHPE-3150 manufactured by Daicel Chemical Industries Ltd.], and a thermal cationic polymerization initiator ["San-aid SI-60L" manufactured by Sanshin Chemical Industry Co., Ltd.] in an amount of 1% (0.001 g) relative to the above "EHPE-3150", and the whole was stirred to achieve complete dissolution.

Thus, an ethyl acetate solution of an optical refractive index-modifying polymer composition was prepared. Incidentally, the ratio of PVMA to the thermally curable epoxy resin used in the composition was 25 parts of the thermally curable epoxy resin per 100 parts of PVMA.

Then, in a clean room, a silicon wafer was spin-coated with the above ethyl acetate solution of the optical refractive index-modifying polymer composition by means of a spin coater (trade name "Spin Coater 1H-DX" manufactured by MIKASA). The conditions for the spin coating were 2,000 rpm and 2 seconds. Thereafter, the solvent was dried on a hot plate set at 50° C. for about 4 minutes.

Furthermore, the spin-coated product was dried under reduced pressure at 40° C. for 5 hours to prepare a film having a thickness of about 7 μm on the silicon wafer, which was used as a sample for optical refractive index modulation. The above silicon wafer was used without particular washing treatment.

Then, the film on the silicon wafer was irradiated with ultraviolet light. At the irradiation, an "ultraviolet Irradiation Apparatus CV-110Q-G" (apparatus type name) manufactured by Fusion ultraviolet Systems Japan is employed and a metal halide lamp was used as a light source.

Incidentally, the metal halide lamp emitted a light having a wavelength range of 250 nm to 450 nm. When an ultraviolet-visible absorption spectrum of PVMA was measured beforehand, it showed absorption of the side-chain vinyl group at a range of 280 to 300 nm, so that it was judged that no influence was induced by the irradiation with the other wavelength and hence a wavelength filter was not particularly employed.

The irradiation intensity was measured by means of an ultraviolet radiometer for high energy, "ultraviolet Power Pack Irradiation Meter" manufactured by Fusion ultraviolet Systems Japan.

The ultraviolet irradiation was carried out under conditions of H valve, an output of 55%, an irradiation distance of 40 mm, and a line velocity of 4 m/minute without using any filter. The integrated light quantity was found to be 1.072 J/cm$^2$ under the conditions. The illumination intensity and light quantity at each wavelength were as shown in Table 1.

TABLE 1

| Ultraviolet wavelength band | Illumination intensity (W/cm$^2$) | Light quantity (J/cm$^2$) |
| --- | --- | --- |
| UVA (320 to 390 nm) | 1.672 | 0.388 |
| UVB (280 to 320 nm) | 1.412 | 0.342 |
| UVC (250 to 260 nm) | 0.250 | 0.058 |
| UVV (395 to 445 nm) | 1.236 | 0.284 |
| Integrated quantity | — | 1.072 |

Thus, after irradiation with ultraviolet ray in an integrated light quantity of 1.072 J/cm$^2$, a thermal curing treatment was carried out by heating the film on a hot plate at 70° C. for 1 hour and further at 100° C. for 1 hour. Refractive index at that time (refractive index after ultraviolet irradiation and thermal curing treatment) and refractive index before ultraviolet irradiation were measured. Moreover, after thermal curing treatment, the film was further irradiated with the ultraviolet ray in an integrated light quantity of 1.072 J/cm$^2$ and refractive index of the film was measured. The results are as shown in Table 2.

The above refractive index was measured with He—Ne laser (wavelength 633 nm) by m-line method (prism coupling method) in a TE (transverse electric) mode (a polarized wave mode of a light in the direction parallel to the film surface of a material) and in a TM (transverse magnetic) mode (a polarized wave mode of a light in the direction perpendicular to the film surface of a material).

TABLE 2

| | TE mode | Δn (difference in refractive index) | TE mode | Δn (difference in refractive index) |
| --- | --- | --- | --- | --- |
| Before ultraviolet irradiation | 1.48250 | — | 1.48097 | — |
| After ultraviolet irradiation/ thermal curing treatment | 1.49673 | 0.01423 | 1.49777 | 0.01680 |
| After further ultraviolet irradiation | 1.49833 | 0.00160 | 1.49856 | 0.00079 |

As apparent from the above results, refractive index could be increased from 1.48250 to 1.49673 (difference in refractive index: 0.01423) in the TE mode by ultraviolet irradiation and thermal curing treatment of the film. Moreover, refractive index after the film was again subjected to ultraviolet irradiation was 1.49833 (difference in refractive index from that of the film after first thermal curing treatment: 0.00160) in the TE mode and thus increase in refractive index was suppressed to a low level against additional ultraviolet irradiation.

EXAMPLE 2

<Preparation of Sample for Optical Refractive Index Modulation>

To 1.5 g of ethyl acetate were added 0.35 g of PVMA obtained in Example 1, "Irgacure 907" in an amount of 1% (0.0035 g) relative to PVMA, 0.15 g of "EHPE-3150 as a thermally curable epoxy resin, and "San-aid SI-60L" as a thermal cationic polymerization initiator in an amount of 1% (0.0015 g) relative to the above "EHPE-3150", and the whole was stirred to achieve complete dissolution.

Thus, an ethyl acetate solution of an optical refractive index-modifying polymer composition was prepared. Incidentally, the ratio of PVMA to the thermally curable epoxy resin used in the composition was about 43 parts of the thermally curable epoxy resin per 100 parts of PVMA.

Then, in a clean room, a silicon wafer was spin-coated with the above ethyl acetate solution of the optical refractive index-modifying polymer composition by means of a spin coater (trade name "Spin Coater 1H-DX" manufactured by MIKASA). The conditions for the spin coating were 2,000 rpm and 2 seconds. Thereafter, the solvent was dried on a hot plate set at 50° C. for about 4 minutes.

Furthermore, the spin-coated product was dried under reduced pressure at 40° C. for 5 hours to prepare a film having a thickness of about 7 μm on the silicon wafer, which was used as a sample for optical refractive index modulation. The above silicon wafer was used without particular washing treatment.

After irradiation of the film on the silicon wafer with ultraviolet ray in the same manner as in Example 1 in an integrated light quantity of 1.072 J/cm$^2$, a thermal curing treatment was carried out by heating the film on a hot plate at 70° C. for 1 hour and further at 100° C. for 1 hour. Refractive index at that time (refractive index after ultraviolet irradiation and thermal curing treatment) and refractive index before ultraviolet irradiation were measured. Moreover, after thermal curing treatment, the film was further irradiated with the ultraviolet ray in an integrated light quantity of 1.072 J/cm$^2$ and refractive index of the film was measured. The measurement of refractive index was carried out in the same manner as in Example 1. The results are as shown in Table 3.

TABLE 3

| | TE mode | Δn (difference in refractive index) | TE mode | Δn (difference in refractive index) |
| --- | --- | --- | --- | --- |
| Before ultraviolet irradiation | 1.48842 | — | 1.48880 | — |
| After ultraviolet irradiation/ thermal curing treatment | 1.49749 | 0.00907 | 1.49771 | 0.00891 |
| After further ultraviolet irradiation | 1.49967 | 0.00218 | 1.49951 | 0.00180 |

As apparent from the above results, refractive index could be increased from 1.48842 to 1.49749 (difference in refractive index: 0.00907) in the TE mode by ultraviolet irradiation and thermal curing treatment of the film. Moreover, refractive index after the film was again subjected to ultraviolet irradiation was 1.49967 (difference in refractive index from that of the film after first thermal curing treatment: 0.00218) in the TE mode and thus increase in refractive index was suppressed to a low level against additional ultraviolet irradiation.

COMPARATIVE EXAMPLE 1

<Preparation of Sample for Optical Refractive Index Modulation>

To 1.5 g of ethyl acetate were added 0.5 g of PVMA obtained in Example 1 and "Irgacure 907" in an amount of 1% (0.005 g) relative to PVMA, and the whole was stirred to achieve complete dissolution. Thus, an ethyl acetate solution of an optical refractive index-modifying polymer composition was prepared. The composition is constituted by PVMA and the photoinitiator alone without using any thermally curable polymer.

Then, in a clean room, a silicon wafer was spin-coated with the above ethyl acetate solution of the optical refractive index-modifying polymer composition by means of a spin coater (trade name "Spin Coater 1H-DX" manufactured by MIKASA). The conditions for the spin coating were 2,000 rpm and 2 seconds. Thereafter, the solvent was dried on a hot plate set at 50° C. for about 4 minutes.

Furthermore, the spin-coated product was dried under reduced pressure at 40° C. for 5 hours to prepare a film having a thickness of about 7 µm on the silicon wafer, which was used as a sample for optical refractive index modulation. The above silicon wafer was used without particular washing treatment.

After irradiation of the film on the silicon wafer with ultraviolet ray in the same manner as in Example 1 in an integrated light quantity of 1.072 J/cm², a thermal curing treatment was carried out by heating the film on a hot plate at 70° C. for 1 hour and further at 100° C. for 1 hour. Refractive index at that time (refractive index after ultraviolet irradiation and thermal curing treatment) and refractive index before ultraviolet irradiation were measured. Moreover, after thermal curing treatment, the film was further irradiated with the ultraviolet ray in an integrated light quantity of 1.072 J/cm² and refractive index of the film was measured. The measurement of refractive index was carried out in the same manner as in Example 1. The results are as shown in Table 4.

TABLE 4

|  | TE mode | Δn (difference in refractive index) | TE mode | Δn (difference in refractive index) |
| --- | --- | --- | --- | --- |
| Before ultraviolet irradiation | 1.48133 | — | 1.48155 | — |
| After ultraviolet irradiation/thermal curing treatment | 1.49253 | 0.01120 | 1.49372 | 0.01217 |
| After further ultraviolet irradiation | 1.49585 | 0.00332 | 1.49635 | 0.00263 |

As apparent from the above results, refractive index could be increased from 1.48133 to 1.49253 (difference in refractive index: 0.01120) in the TE mode by ultraviolet irradiation and thermal curing treatment of the film. However, thereafter, refractive index after the film was again subjected to ultraviolet irradiation was 1.49585 (difference in refractive index from that of the film after first thermal curing treatment: 0.00332) in the TE mode and thus increase in refractive index was slightly high against additional ultraviolet irradiation.

While the invention has been described in detail and with reference to specific embodiments thereof, it will be apparent to one skilled in the art that various changes and modifications can be made therein without departing from the spirit and scope thereof.

The present application is based on Japanese Patent Application No. 2005-002592 filed on Jan. 7, 2005, and the contents are incorporated herein by reference.

INDUSTRIAL APPLICABILITY

The present invention can provide an optical refractive index-modifying material which can efficiently modulate (change) refractive index upon light irradiation, and exhibits such high storage stability that the once modulated refractive index does not substantially change anymore upon time elapse. Moreover, it can provide a hologram recording material using the same and a method of controlling refractive index.

The invention claimed is:

1. An optical refractive index-modifying polymer composition comprising as a main component a polymer (A) which is a polymer of monomers including as an essential component an acrylic vinyl monomer represented by the following formula (1):

$$CH_2=C(R^1)-C(=O)O-R^2=CH_2 \qquad (1)$$

wherein $R^1$ represents a hydrogen atom or a methyl group, $R^2$ represents a saturated or unsaturated hydrocarbon group having 1 to 20 carbon atoms, and the molecule may contain an additional hetero atom or a halogen atom, wherein the polymer (A) contains a remaining radical-polymerizable side-chain vinyl group in the molecule, and the composition comprises a thermally curable polymer (B) in an amount of 5 to 60 parts by weight per 100 parts by weight of the polymer (A), and wherein the acrylic vinyl monomer is a vinyl methacrylate, vinylethyl methacrylate, vinyloctyl methacrylate, vinylhexyl methacrylate, vinylbutyl methacrylate, vinyl acrylate, or vinylethyl acrylate.

2. The optical refractive index-modifying polymer composition according to claim 1, wherein an increase in refractive index (Δn) before and after irradiation is 0.005 or more when the composition is irradiated with a light in an ultraviolet region in an integrated light quantity of 10 J/cm² or less.

3. The optical refractive index-modifying polymer composition according to claim 1, wherein a difference (Y–X) between refractive index (X) after modulating refractive index upon irradiation and further thermally curing the thermally curable polymer (B) upon heating at a temperature equal to or higher than the curing temperature of the thermally curable polymer (B) and refractive index (Y) when the composition is subsequently irradiated with a light in an ultraviolet region in an integrated light quantity of 1 J/cm² or less, is 0.003 or less.

4. The optical refractive index-modifying polymer composition according to claim 1, wherein tacticity of the polymer (A) is 70% or more as syndiotacticity (rr).

5. The optical refractive index-modifying polymer composition according to claim 1, wherein the thermally curable polymer (B) is a thermally curable polymer having at least two epoxy groups in the molecule.

6. The optical refractive index-modifying polymer composition according to claim 5, which contains the thermally curable polymer (B) in an amount of 5 to 35 parts by weight per 100 parts by weight of the polymer (A).

7. The optical refractive index-modifying polymer composition according to claim 1, wherein the curing temperature of the thermally curable polymer (B) is 150° C. or lower.

8. The optical refractive index-modifying polymer composition according to claim 1, which contains at least one selected from a photoinitiator, a sensitizer, a chain transfer agent, and a thermally acid-generating agent.

9. A hologram recording material comprising the optical refractive index-modifying polymer composition according to claim 1.

10. A method of controlling refractive index comprising modulating refractive index upon irradiating the optical refractive index-modifying polymer composition according to claim 1 with a light and subsequently thermally curing the thermally curable polymer (B) upon heating at a temperature equal to or higher than the curing temperature of the thermally curable polymer (B).

* * * * *